(12) United States Patent
Matsui et al.

(10) Patent No.: US 12,457,408 B2
(45) Date of Patent: Oct. 28, 2025

(54) IMAGE PROCESSING APPARATUS, CONTROL METHOD, AND STORAGE MEDIUM

(71) Applicant: CANON KABUSHIKI KAISHA, Tokyo (JP)

(72) Inventors: Shun Matsui, Tokyo (JP); Yoichi Takikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 38 days.

(21) Appl. No.: 18/418,681

(22) Filed: Jan. 22, 2024

(65) Prior Publication Data

US 2024/0259667 A1   Aug. 1, 2024

(30) Foreign Application Priority Data

Feb. 1, 2023 (JP) ................... 2023-013790

(51) Int. Cl.

| | |
|---|---|
| *H04N 23/611* | (2023.01) |
| *H04N 5/265* | (2006.01) |
| *H04N 5/272* | (2006.01) |
| *H04N 23/11* | (2023.01) |
| *H04N 23/13* | (2023.01) |
| *H04N 23/45* | (2023.01) |
| *H04N 23/65* | (2023.01) |
| *H04N 23/84* | (2023.01) |

(52) U.S. Cl.
CPC .......... *H04N 23/611* (2023.01); *H04N 5/265* (2013.01); *H04N 5/272* (2013.01); *H04N 23/11* (2023.01); *H04N 23/13* (2023.01); *H04N 23/45* (2023.01); *H04N 23/65* (2023.01); *H04N 23/84* (2023.01)

(58) Field of Classification Search
CPC ...... H04N 23/611; H04N 23/65; H04N 5/265; H04N 5/272; H04N 23/11; H04N 23/45
See application file for complete search history.

(56) References Cited

U.S. PATENT DOCUMENTS

| | | | |
|---|---|---|---|
| 11,381,743 B1* | 7/2022 | Mahbub | H04N 23/65 |
| 12,069,399 B2* | 8/2024 | Patton | H04N 23/56 |
| 12,277,794 B1* | 4/2025 | Wang | G06V 40/107 |
| 2012/0224019 A1* | 9/2012 | Samadani | H04N 5/325 |
| | | | 348/14.01 |
| 2019/0199926 A1* | 6/2019 | An | H04N 23/45 |
| 2022/0237813 A1* | 7/2022 | Feng | G06T 7/571 |
| 2023/0074386 A1* | 3/2023 | Zhang | H04N 23/65 |
| 2024/0040215 A1* | 2/2024 | Nobuoka | G06T 5/50 |

FOREIGN PATENT DOCUMENTS

JP   2005-223605 A   8/2005

* cited by examiner

*Primary Examiner* — Boubacar Abdou Tchoussou

(74) *Attorney, Agent, or Firm* — Cowan, Liebowitz & Latman, P.C.

(57) ABSTRACT

An image processing apparatus includes a first image sensor unit configured to acquire a first image, a second image sensor unit having a characteristic different from that of the first image sensor unit and configured to acquire a second image, and a processor configured to generate detection information about an object based on the first image and to control driving of the second image sensor unit based on the detection information.

21 Claims, 14 Drawing Sheets

IMAGE PROCESSING APPARATUS, CONTROL METHOD, AND STORAGE MEDIUM

BACKGROUND

Technical Field

One of the aspects of the embodiments relates to an image processing apparatus.

Description of Related Art

Recently, some technologies have generated a display image by combining images acquired by a plurality of sensors having different characteristics to improve visibility.

Japanese Patent Laid-open No. 2005-223605 discloses a system including two image pickup apparatuses having mutually different characteristics, and configured to generate third image data through weighted averaging of first and second image data acquired by the respective image pickup apparatuses and to display the third image data on a display apparatus.

However, in the system of Japanese Patent Laid-open No. 2005-223605, a plurality of sensors are simultaneously operated and output data therefrom is simultaneously processed, and thus the system has problems of increase in the amount of electric power, the amount of calculation, the amount of memory occupation, and the amount of bus band occupation.

SUMMARY

An image processing apparatus according to one aspect of the embodiment includes a first image sensor unit configured to acquire a first image, a second image sensor unit having a characteristic different from that of the first image sensor unit and configured to acquire a second image, and a processor configured to generate detection information about an object based on the first image and to control driving of the second image sensor unit based on the detection information. A control method of the above image processing also constitutes another aspect of the embodiment. A storage medium storing a program that causes a computer to execute the above control method also constitutes another aspect of the embodiment.

Further features of various embodiments of the disclosure will become apparent from the following description of embodiments with reference to the attached drawings.

DESCRIPTION OF THE EMBODIMENTS

Figure 1:
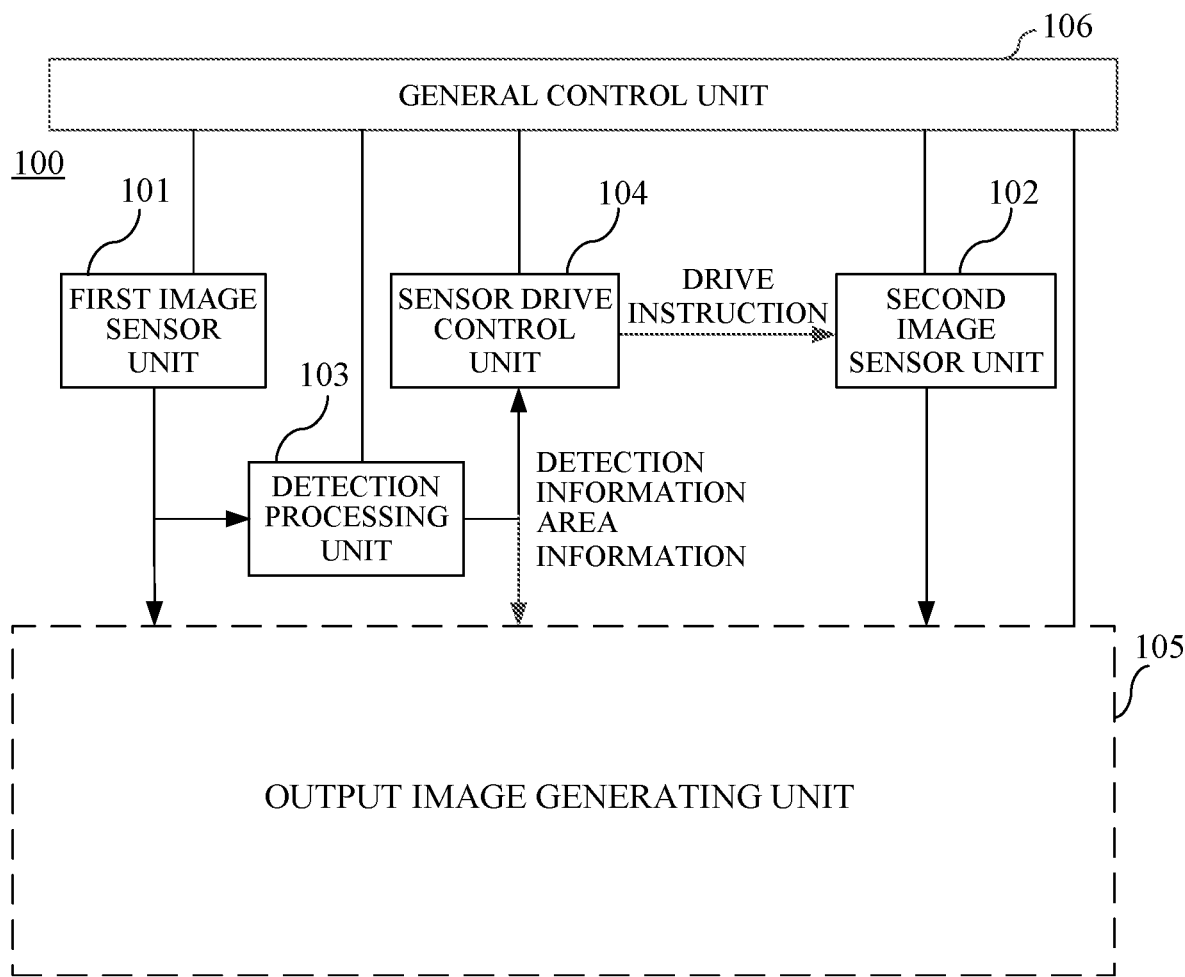
FIG. 1 illustrates the configuration of an image processing apparatus according to Example 1.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure. Corresponding elements in respective figures will be designated by the same reference numerals, and a duplicate description thereof will be omitted.

Example 1

An image processing apparatus according to this example generates a highly visible image using an image including polarization information acquired from a polarization image sensor. An image processing apparatus according to this example includes an image sensor included in, for example, a digital camera, and a module configured to perform image processing.

The configuration of an image processing apparatus 100 according to this example will be described below with reference to FIG. 1. FIG. 1 illustrates the configuration of the image processing apparatus 100 according to this example.

A first image sensor unit 101 is a normal RGB image sensor and acquires a first image. A second image sensor unit 102 is a polarization image sensor and acquires a second image. The polarization image sensor is, for example, a CMOS image sensor in which a plurality of polarizers are mounted between a microlens and a photodiode at a plurality of different angles at each pixel.

Figure 2:
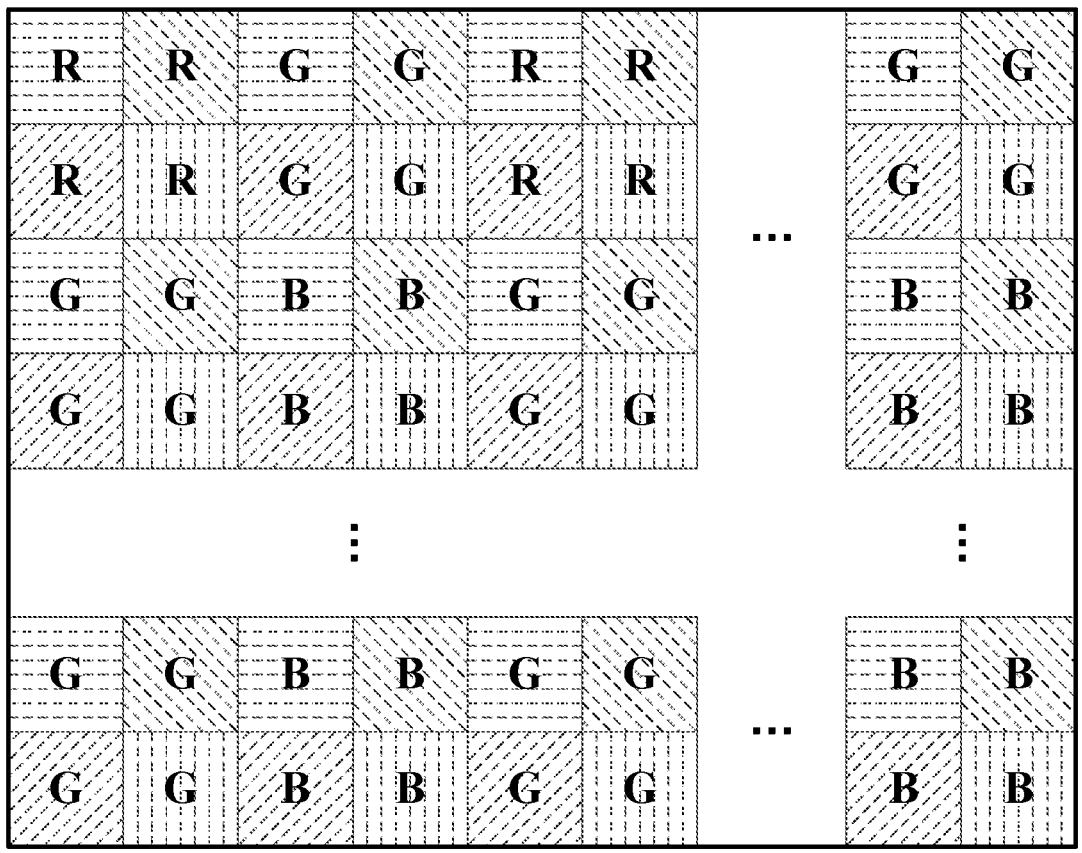
FIG. 2 illustrates the configuration of a polarization image sensor according to Example 1.

FIG. 2 illustrates the configuration of the polarization image sensor. FIG. 2 illustrates an array of RGB pixels at four types of angles of the polarizers of 0°, 45°, 90°, and 135°, and the polarization directions of these pixels. Pixels with color filters of the same color are adjacently disposed in an area with two pixels in the horizontal direction and two pixels in the vertical direction and receive light having passed through the polarizers at different angles, respectively. Accordingly, the polarization image sensor can acquire four Bayer images with different polarization directions.

A detection processing unit 103 generates detection information and area information about an object by performing object detection processing for the first image. In this example, a "car window" is detected as the object.

A sensor drive control unit 104 controls the second image sensor unit 102. The sensor drive control unit (control unit) 104 switches on and off the second image sensor unit 102 by controlling power supply to the second image sensor unit 102 in accordance with a result of the detection processing by the detection processing unit 103.

An output image generating unit 105 generates an output image using the first and second images based on at least one of the detection information and the area information.

A general control unit 106 controls operation of the entire image processing apparatus 100. The general control unit 106 includes, for example, a CPU, a ROM, and a RAM and controls each component of the image processing apparatus 100 by reading a computer program stored in the ROM onto the RAM and executing the computer program at the CPU. At least part of the general control unit 106 may be implemented by a dedicated hardware circuit.

Figure 3:
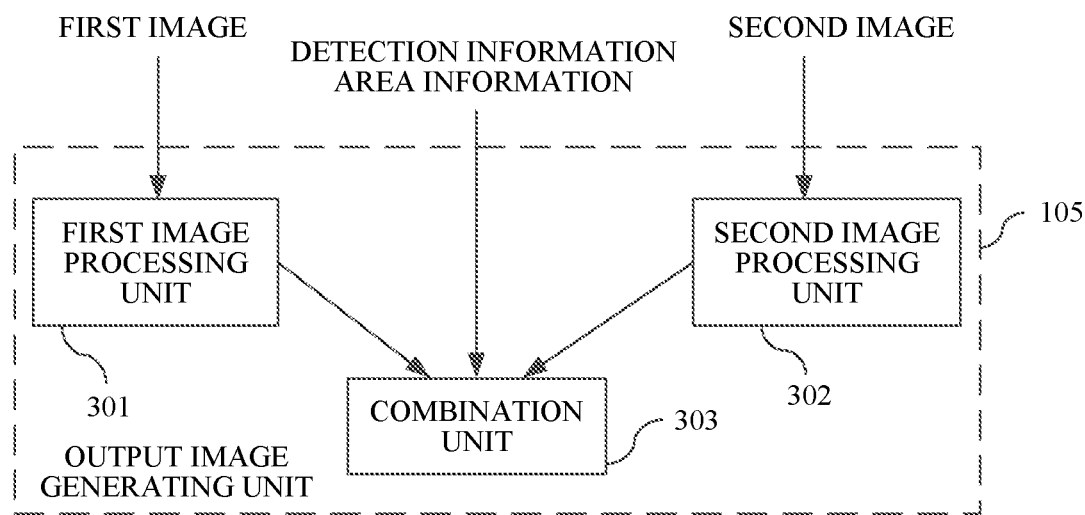
FIG. 3 illustrates the configuration of an output image generating unit according to Example 1.

The configuration of the output image generating unit 105 will be described below in detail with reference to FIG. 3. FIG. 3 illustrates the configuration of the output image generating unit 105.

A first image processing unit 301 generates a first processed image by performing image processing for the first image. A second image processing unit 302 generates a second processed image by performing image processing for the second image. A combination unit 303 generates a combined image by blending the first and second processed images based on at least one of the detection information and the area information.

Figure 4:
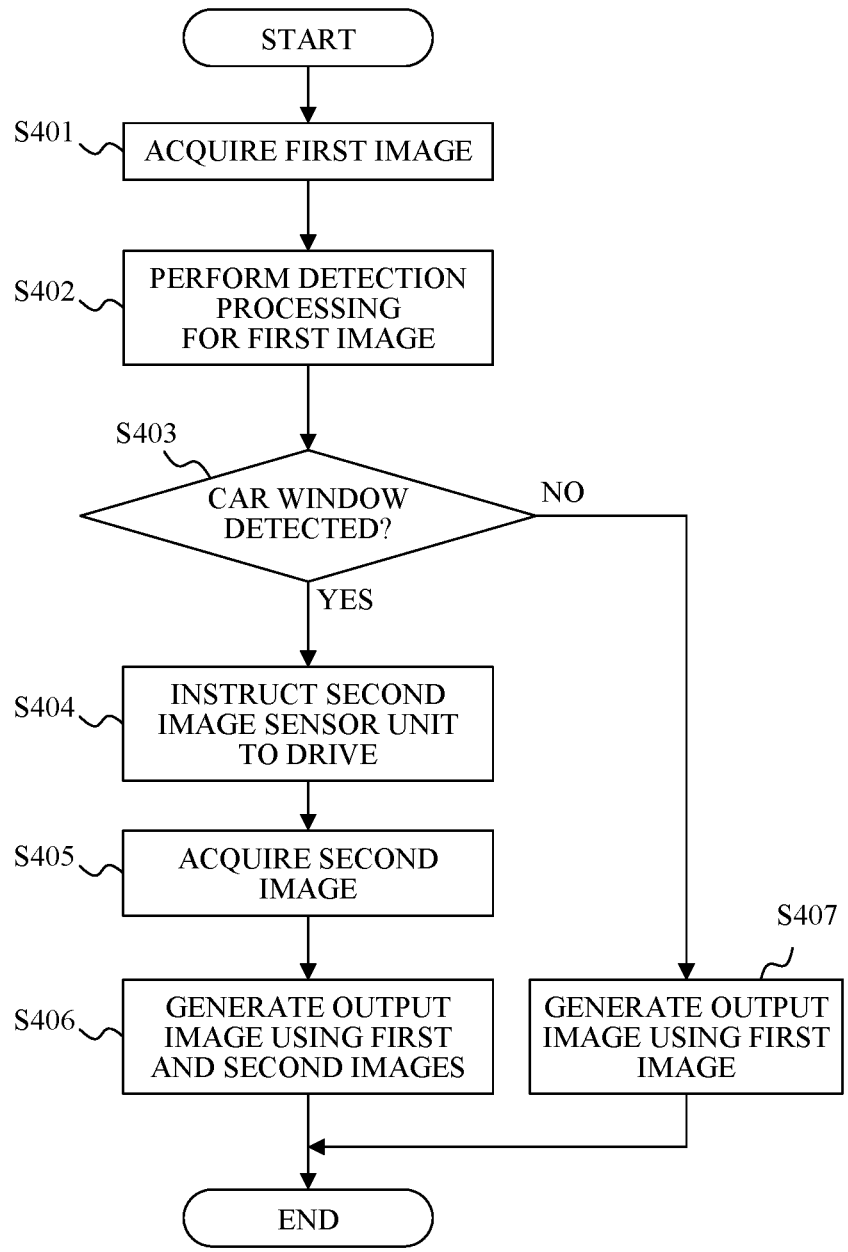
FIG. 4 illustrates a processing flow according to Example 1.

Processing according to this example will be described below in detail with reference to a flowchart in FIG. 4.

At step S401, the first image sensor unit 101 acquires a first image.

At step S402, the detection processing unit 103 performs detection processing for the first image. The detection processing unit 103 determines whether a car window exists in the first image, and outputs a result of the determination as detection information. When having determined that a car window exists, the detection processing unit 103 outputs, as area information, information indicating an image area corresponding to the car window. After image processing identical or similar to step S501 to be described below is performed for the first image, the detection processing may be performed using a processing result image.

At step S403, the detection processing unit 103 determines whether the car window is detected. In a case where it is determined that the car window is detected, the flow proceeds to step S404. In a case where it is determined that no car window is detected, the flow proceeds to step S407.

At step S404, the sensor drive control unit 104 instructs the second image sensor unit 102 to drive.

At step S405, the second image sensor unit 102 acquires a second image.

At step S406, the output image generating unit 105 generates an output image using the first and second images and the flow ends.

At step S407, the output image generating unit 105 generates an output image using the first image and the flow ends.

Figure 5:
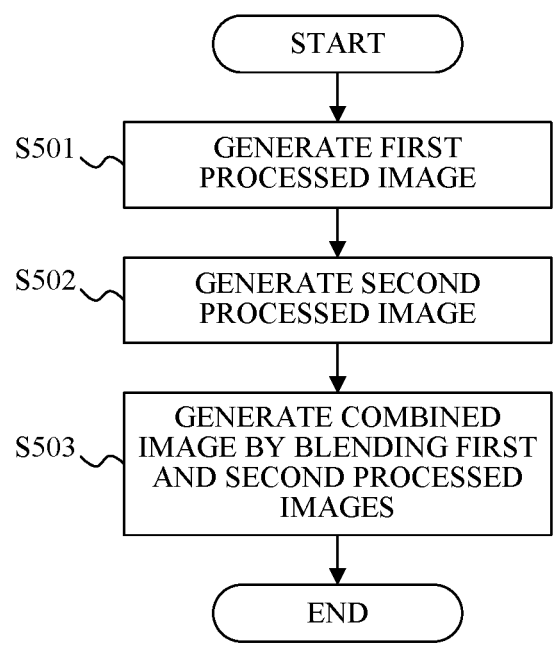
FIG. 5 illustrates an output image generation processing flow according to Example 1.

The processing at step S406 will be described below in detail with reference to a flowchart in FIG. 5.

At step S501, the first image processing unit 301 generates a first processed image by performing image processing for the first image. The performed image processing is development processing such as white balance adjustment processing, noise reduction processing, color interpolation (debayer) processing, and gamma processing.

At step S502, the second image processing unit 302 generates a second processed image by performing image processing for the second image. The performed image processing is polarization component integration processing and development processing such as white balance adjustment processing, noise reduction processing, color interpolation (debayer) processing, and gamma processing.

The polarization component integration processing will be described below. The second image is four Bayer images with different polarization directions as described above. The four images are integrated to generate one integrated Bayer image. For example, the pixel values of the four Bayer images are compared at each corresponding position, and the minimum pixel value is selected as a pixel value of the integrated Bayer image. This processing can reduce a component reflected at the glass surface of the car window and selectively hold a component transmitting through the glass surface of the car window. As a result, visibility inside the automobile improves.

The second image processing unit 302 may generate a polarization map in addition to the second processed image. More specifically, the polarization map is produced by calculating dispersion of the pixel values of the four Bayer images at each corresponding position and storing a result of the calculation for each pixel. The polarization component may be determined to large and "1" may be stored in a case where the dispersion is equal to or larger than a predetermined value, and the polarization component may be determined to be small and "0" may be stored otherwise. The difference between the maximum and minimum values may be stored in place of the dispersion.

At step S503, the combination unit 303 generates a combined image by blending the first and second processed images. The combination unit 303 uses the second processed image in the area corresponding to the detected car window and uses the first processed image in the other area. The combination unit 303 may determine, in accordance with the polarization map generated at step S502, which of the first and second processed images is to be used at each pixel in the area corresponding to the car window. Alternatively, the combination unit 303 may use a result of the weighted average of the first and second processed images with certain weights in the area corresponding to the detected car window and may use the first processed image in the other area. The weights may be determined using the polarization map generated at step S502.

Figure 6A:
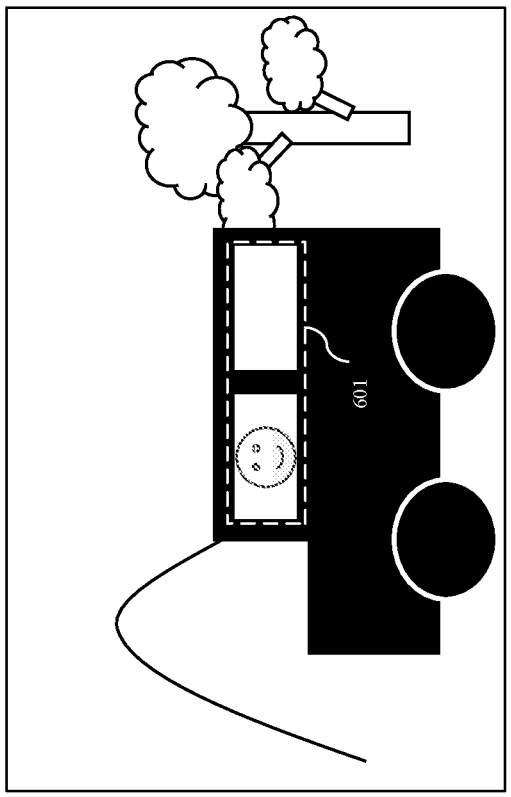
FIGS. 6A, 6B, and 6C are schematic diagrams of output images in Example 1.
Figure 6B:
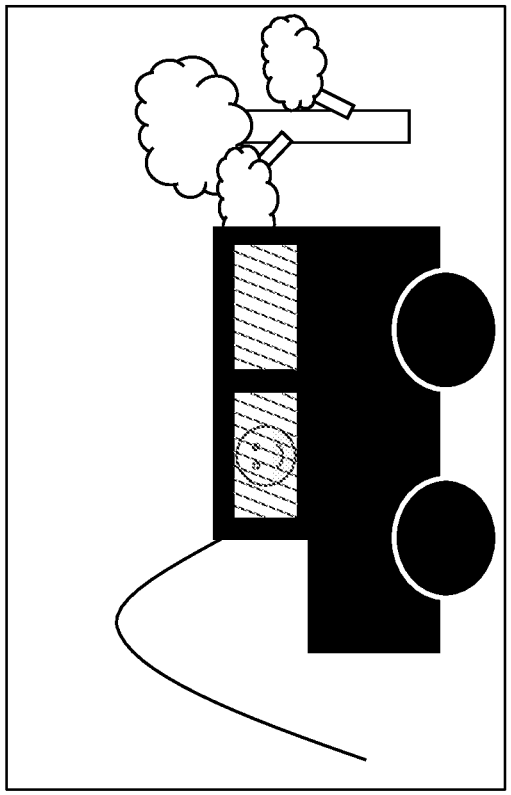
Figure 6C:
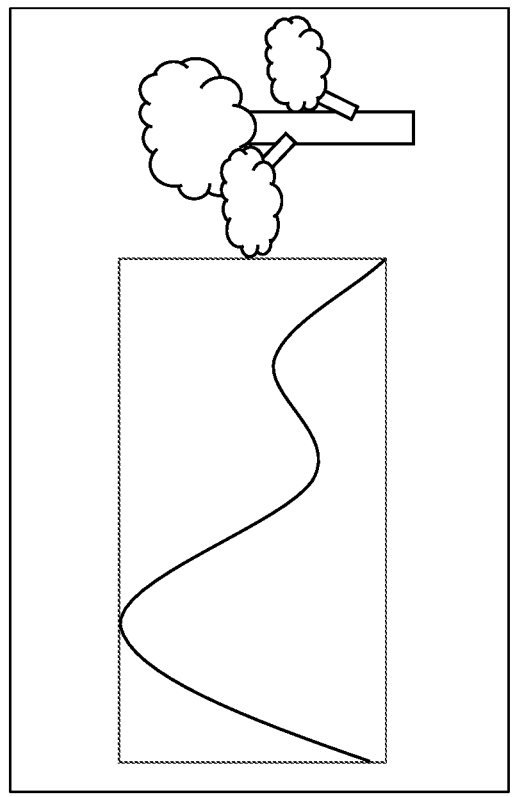

FIGS. 6A, 6B, and 6C are schematic diagrams of the first processed image and the combined image generated by blending the first and second processed images.

FIG. 6A illustrates the first processed image in a case where it is determined that a car window is detected. The first processed image in FIG. 6A is a processed image generated by performing development processing for an image acquired by the first image sensor unit 101 that is a normal RGB sensor. In the image, light is reflected at the car window and the visibility of the car window is low.

FIG. 6B is an example of an output image generated at step S406 in a case where it is determined that a car window is detected. The output image in FIG. 6B is the combined image generated by blending the first and second processed images. In the image, the second processed image generated by developing an image with an integrated polarization component is used in an area 601 corresponding to the car window, and thus light reflection at the car window is reduced and the visibility is high.

FIG. 6C is an example of an output image generated at step S407 in a case where it is determined that no car window is detected. The output image in FIG. 6C remains the first processed image without driving the second image sensor unit 102 or performing image combination.

Since the second image sensor unit 102 is operated only in a case where a predetermined object is detected as described above, the power, the calculation amount, the memory occupation amount, and the bus band occupation amount can be saved.

In this example, the second image sensor unit 102 is driven for the entire image area only in a case where a detection target object is detected. However, the second image sensor unit may be driven to acquire the second image only for an image area in which the detection target object is detected (image area corresponding to the area information), not for the entire image area. Accordingly, the amount of electric power can be further reduced.

The detection target object may be an object other than a car window. For example, an object at which specular reflection is likely to occur, such as the glass surface of a window in a town or a glass of a person, or the water surface of a pond may be detected and an area corresponding to the object may be replaced with the second processed image to improve visibility. Moreover, shininess of a face may be detected and removed.

The detection processing unit 103 and the sensor drive control unit 104 may be included in the first image sensor unit 101 (disposed in the same chip).

Example 2

In performing face detection processing, an image processing apparatus according to this example determines whether a detected face is the actual face or a false face such as a print using an image including polarization information and acquired from a polarization image sensor. The image processing apparatus according to this example includes an optical system and an image sensor that are used for a digital camera or the like, and a module configured to perform image processing.

Figure 7:
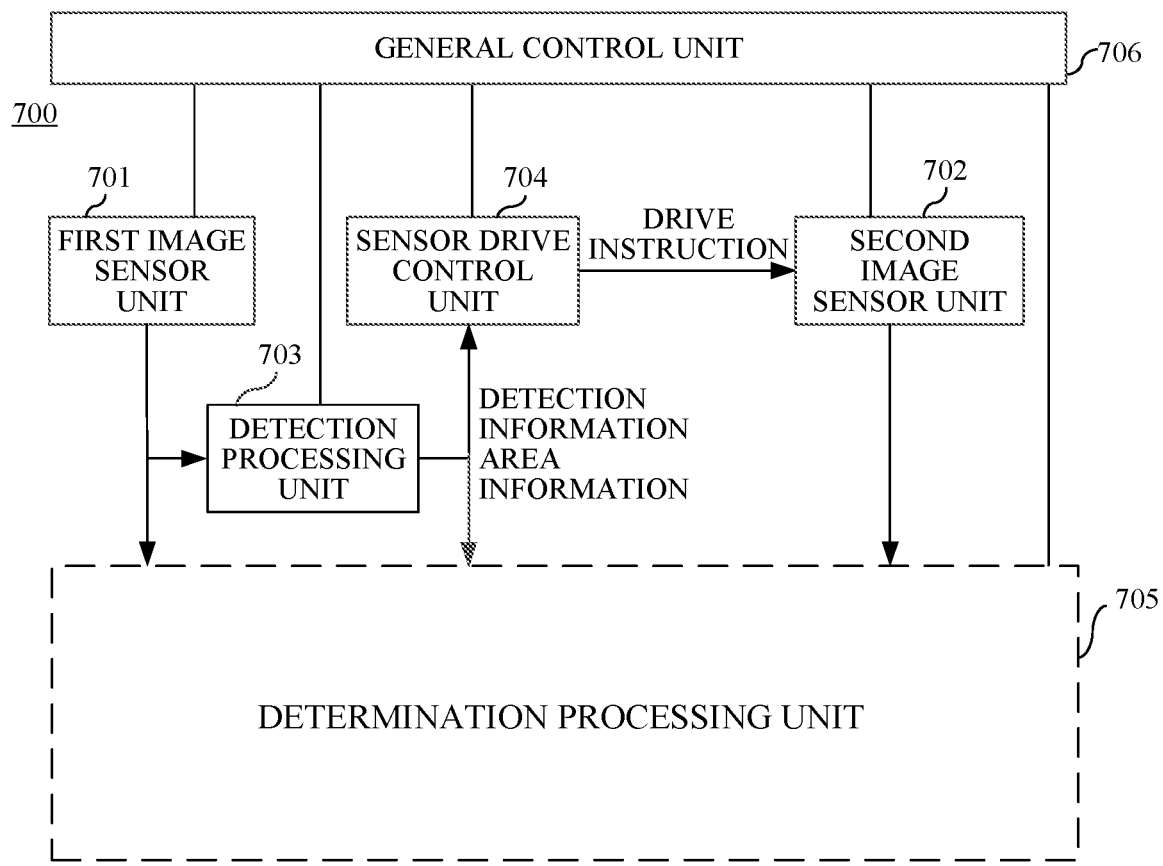
FIG. 7 illustrates the configuration of an image processing apparatus according to Example 2.

The configuration of an image processing apparatus 700 according to this example will be described below with reference to FIG. 7. FIG. 7 illustrates the configuration of the image processing apparatus 700 according to this example.

A first image sensor unit 701 is a normal RGB image sensor and acquires a first image. A second image sensor unit 702 is a polarization image sensor and acquires a second image.

A detection processing unit 703 generates detection information and area information about an object by performing object detection processing for the first image. In this example, a "human face" is detected as the object.

A sensor drive control unit 704 controls the second image sensor unit 702. The sensor drive control unit 704 switches on and off the second image sensor unit 702 by controlling power supply to the second image sensor unit 702 in accordance with a result of the detection processing by the detection processing unit 703.

A determination processing unit 705 performs determination processing using the second image.

A general control unit 706 controls operation of the entire image processing apparatus 700. The general control unit 706 includes, for example, a CPU, a ROM, and a RAM and controls each component of the image processing apparatus 700 by reading a computer program stored in the ROM onto the RAM and executing the computer program at the CPU. At least part of the general control unit 706 may be implemented by a dedicated hardware circuit.

Figure 8:
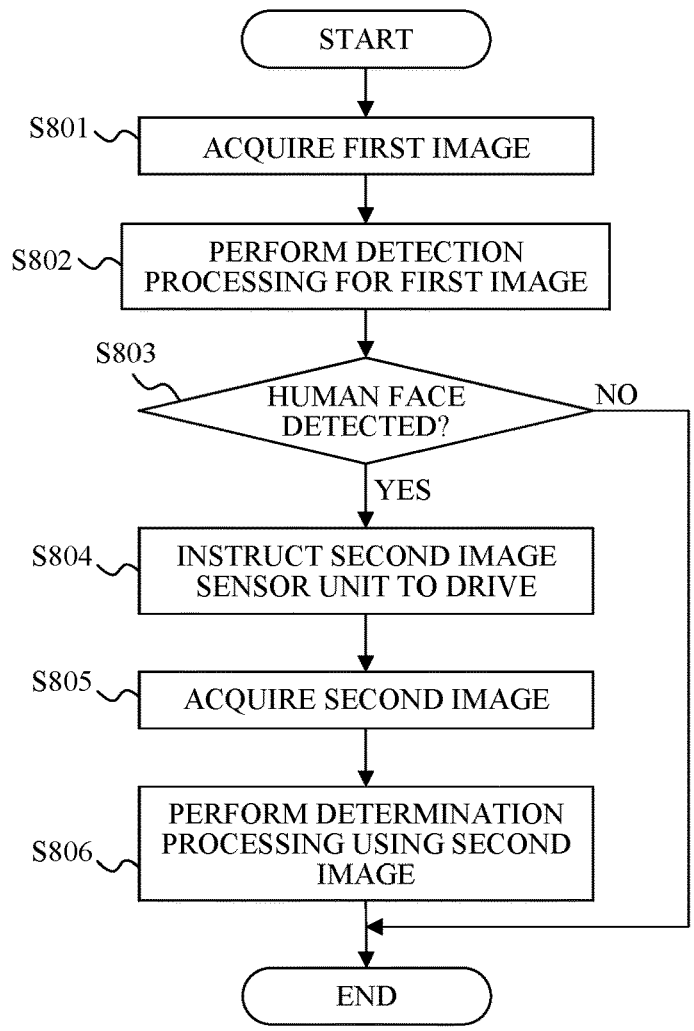
FIG. 8 illustrates an operation flow of an analysis processing unit according to Example 2.

Processing according to this example will be described below in detail with reference to a flowchart in FIG. 8.

At step S801, similarly to step S401 according to Example 1, the first image sensor unit 701 acquires a first image.

At step S802, the detection processing unit 703 performs detection processing for the first image. The detection processing unit 703 determines whether a human face exists in the first image, and outputs a result of the determination as detection information. When having determined a human face exists, the detection processing unit 703 outputs, as area information, information indicating an image area corresponding to the human face.

At step S803, the detection processing unit 703 determines whether a human face is detected. In a case where it is determined that a human face is detected at step S803, the flow proceeds to step S804. In a case where it is determined that no human face is detected at step S803, the flow ends.

At step S804, similarly to step S404 according to Example 1, the sensor drive control unit 704 instructs the second image sensor unit 702 to drive.

At step S805, similarly to step S405 according to Example 1, the second image sensor unit 702 acquires a second image.

At step S806, the determination processing unit 705 performs determination processing using the second image. The determination processing unit 705 first calculates the surface normal of the object based on the second image that is a polarization image. Then, the determination processing unit 705 determines whether the human face detected at step S803 is three-dimensional or two-dimensional using the calculated surface normal. In a case where it is determined that the human face is three-dimensional, it is determined that the detected face is the actual face. In a case where it is determined that the human face is two-dimensional, it is determined that the human face is a false face such as a print. The determination processing unit 705 reflects a result of the determination processing onto personal authentication processing and face/pupil recognition autofocus processing. In one example, when having determined that the detected face is a false face, the determination processing unit 705 performs such control that authentication is not successful. In another example, when having determined that the detected face is a false face, the determination processing unit 705 performs such control that the face is excluded as an autofocus target.

Since the second image sensor unit 702 is operated only in a case where a predetermined object is detected as described above, the power, the calculation amount, the memory occupation amount, and the bus band occupation amount can be saved.

Example 3

An image processing apparatus according to this example generates, using an image including infrared light information and acquired from an infrared image sensor, an image with which damage or the like on fresh food can be easily determined. The image processing apparatus according to this example includes an optical system and an image sensor that are used for a digital camera or the like, and a module configured to perform image processing.

The configuration of the image processing apparatus according to this example is identical to the configuration of the image processing apparatus 100 according to Example 1 (FIG. 1). However, characteristics of the second image sensor unit 102, a target to be detected by the detection processing unit 103, and the configuration and processing contents of the output image generating unit 105 are different from those of Example 1.

The first image sensor unit 101 is a normal RGB image sensor and acquires a first image. The second image sensor unit 102 is an infrared image sensor having sensitivity to near-infrared and acquires a second image.

The detection processing unit 103 generates detection information and area information about an object by performing object detection processing for the first image. In this example, "fresh food" is detected as the object.

The sensor drive control unit 104 controls the second image sensor unit 102. The sensor drive control unit 104 switches on and off the second image sensor unit 102 by controlling power supply to the second image sensor unit 102 in accordance with a result of the detection processing by the detection processing unit 103.

The output image generating unit 105 generates an output image using the first and second images based on at least one of the detection information and the area information. The configuration and processing contents of the output image generating unit 105 are different from those of Example 1.

Figure 9:
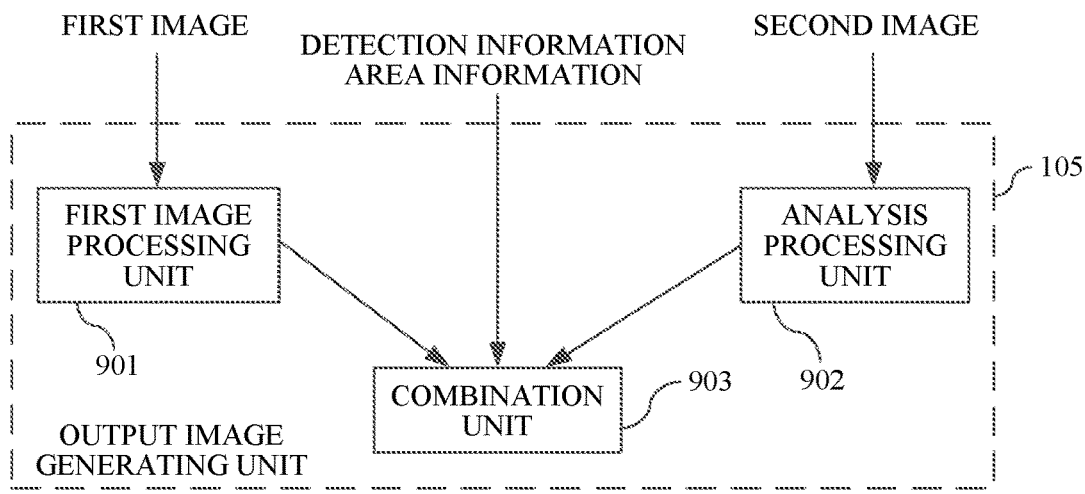
FIG. 9 illustrates the configuration of an output image generating unit according to Example 3.

The configuration of the output image generating unit 105 will be described below in detail with reference to FIG. 9. FIG. 9 illustrates the configuration of the output image generating unit 105 according to this example.

Similarly to the first image processing unit 301 according to Example 1, a first image processing unit 901 generates a first processed image by performing image processing for the first image. An analysis processing unit 902 generates analysis information by performing analysis processing for the second image. The analysis information will be described below in detail. A combination unit 903 generates the combined image by superimposing the analysis information on the first processed image based on at least one of the detection information and the area information.

Figure 10:
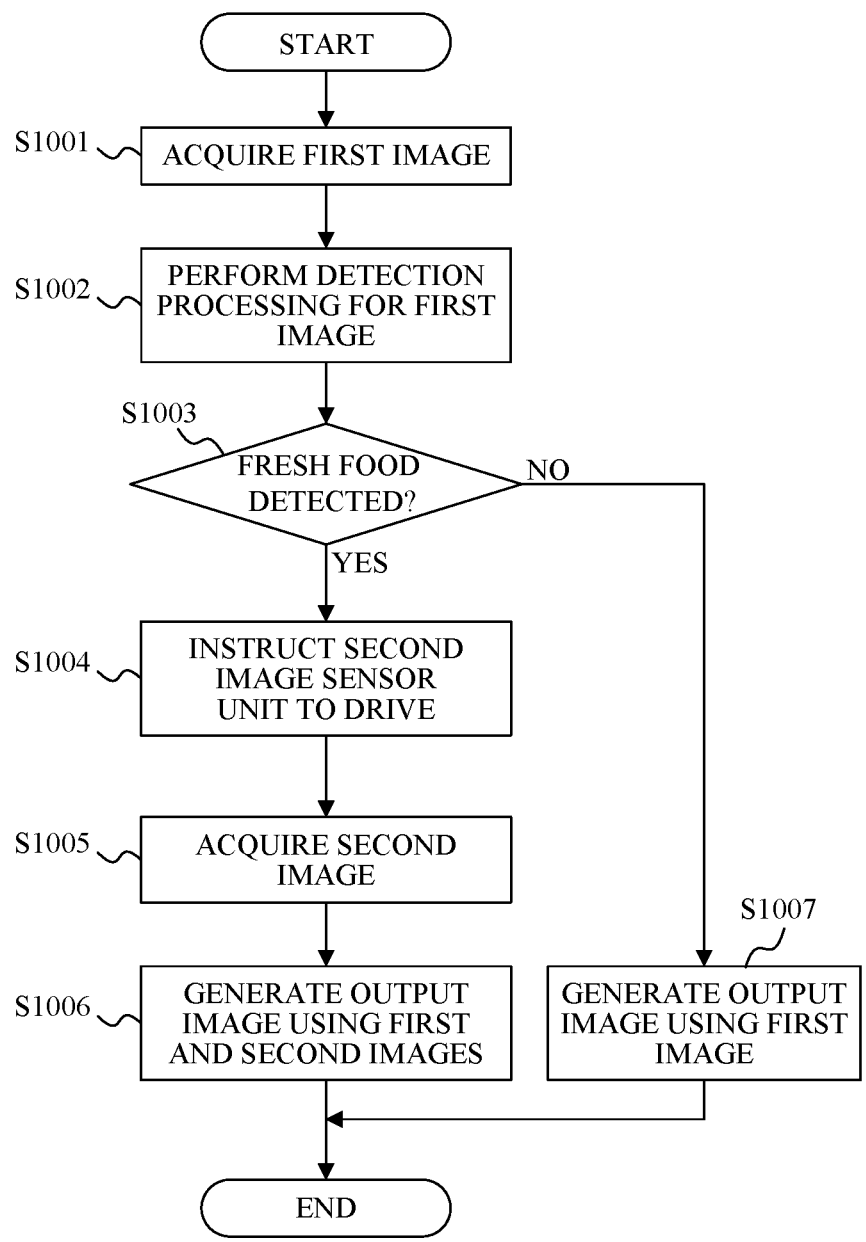
FIG. 10 illustrates a processing flow according to Example 3.

Processing according to this example will be described below in detail with reference to a flowchart in FIG. 10.

At step S1001, similarly to step S401 according to Example 1, the first image sensor unit 101 acquires a first image.

At step S1002, the detection processing unit 103 performs detection processing for the first image. The detection processing unit 103 determines whether fresh food exists in the first image, and outputs a result of the determination as detection information. When having determined that fresh food exists, the detection processing unit 103 outputs, as area information, information indicating an image area corresponding to the fresh food.

At step S1003, the detection processing unit 103 determines whether fresh food is detected. In a case where it is determined that fresh food is detected at step S1003, the flow proceeds to step S1004. In a case where it is determined that no fresh food is detected at step S1003, the flow proceeds to step S1007.

At step S1004, similarly to step S404 according to Example 1, the sensor drive control unit 104 instructs the second image sensor unit 102 to drive.

At step S1005, similarly to step S405 according to Example 1, the second image sensor unit 102 acquires a second image.

At step S1006, the output image generating unit 105 generates an output image using the first and second images and the flow ends.

At step S1007, similarly to step S307 according to Example 1, the output image generating unit 105 generates an output image using the first image and the flow ends. In this example, a first processed image generated at step S1101 to be described below is output as the output image.

Figure 11:
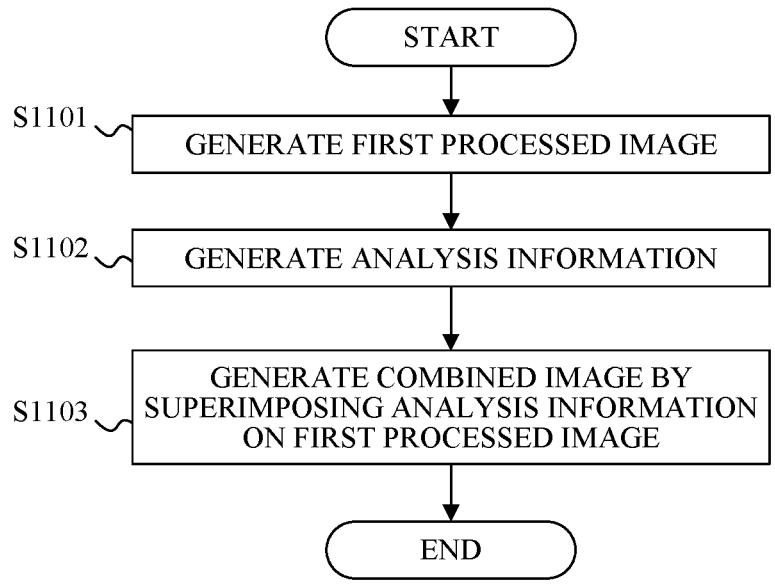
FIG. 11 illustrates a generation processing flow of an output image according to Example 3.

The processing at step S1006 will be described below in detail with reference to FIG. 11.

At step S1101, similarly to step S501 according to Example 1, the first image processing unit 901 generates a first processed image by performing image processing for the first image.

At step S1102, the analysis processing unit 902 generates analysis information by performing analysis processing for the second image. The generated analysis information is, for example, {product name, ripe, damage, recommendation}.

At step S1103, the combination unit 903 generates a combined image by superimposing the analysis information on the first processed image.

Figure 12A:
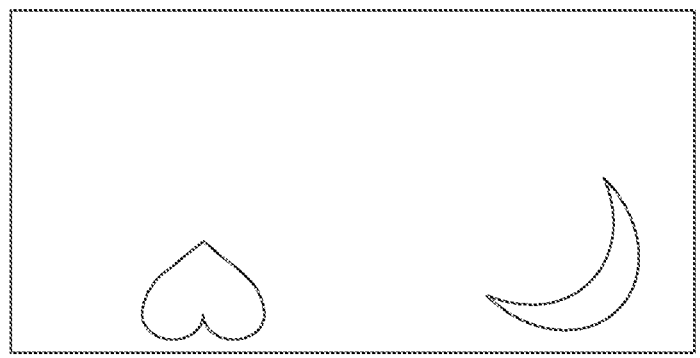
FIGS. 12A and 12B are schematic diagrams of output images in Example 3.
Figure 12B:
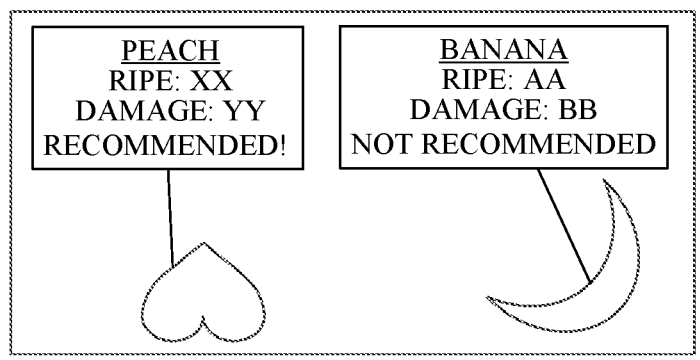

FIG. 12A is an example of the first processed image generated by the first image processing unit 901. In this example, a peach and a banana are detected as illustrative fresh food. FIG. 12B is an example of the combined image generated by superimposing the analysis information on the first processed image. In this example, character information about {product name, ripe, damage, recommendation} is displayed as illustrative analysis information.

A near-infrared image has such a characteristic that damage or the like on fresh food, which is difficult to determine with a visible image, can be easily determined with the near-infrared image, and is used for food examination and the like. This characteristic of a near-infrared image is exploited in this example such that, only in a case where fresh food is detected in a visible image, the infrared image sensor is activated to acquire a near-infrared image, damage or the like on the fresh food is analyzed based on the acquired near-infrared image, and information notifying an area corresponding to the detected fresh food is superimposed. In a case where no fresh food is detected, the infrared image sensor is controlled not to drive.

Since power supply control suitable for properties of an object is performed as described above, the power, the calculation amount, the memory occupation amount, and the bus band occupation amount can be saved.

Example 4

An image processing apparatus according to this example generates a highly visible image by reducing influence of fog and haze in weather using an image including infrared light information and acquired from the infrared image sensor. The image processing apparatus according to this example includes an optical system and an image sensor that are used for a digital camera or the like, and a module configured to perform image processing.

The configuration of the image processing apparatus according to this example is identical to the configuration (FIG. 1) of the image processing apparatus according to Example 1. However, characteristics of the second image sensor unit 102, a target to be detected by the detection processing unit 103, and the processing contents of the output image generating unit 105 are different from those of Example 1.

The first image sensor unit 101 is a normal RGB image sensor and acquires a first image. The second image sensor unit 102 is an infrared image sensor having sensitivity to near-infrared and acquires a second image.

The detection processing unit 103 generates detection information and area information about an object by performing object detection processing for the first image. In this example, a "distant landscape" is detected as the object.

The sensor drive control unit 104 controls the second image sensor unit 102. The sensor drive control unit 104 switches on and off the second image sensor unit 102 by controlling power supply to the second image sensor unit 102 in accordance with a result of the detection processing by the detection processing unit 103.

The output image generating unit 105 generates an output image using the first and second images based on at least one of the detection information and the area information. The processing contents of the output image generating unit 105 are different from those of Example 1. The configuration of the output image generating unit 105 according to this example is identical to the configuration (FIG. 3) of the output image generating unit 105 according to Example 1. However, the processing contents of the combination unit 303 are different from those of Example 1.

The first image processing unit 301 generates a first processed image by performing image processing for the first image. The second image processing unit 302 generates a second processed image by performing image processing for the second image. The combination unit 303 generates a combined image by blending the first and second processed images based on at least one of the detection information and the area information. The processing contents of the combination unit 303 will be described below in detail.

Figure 13:
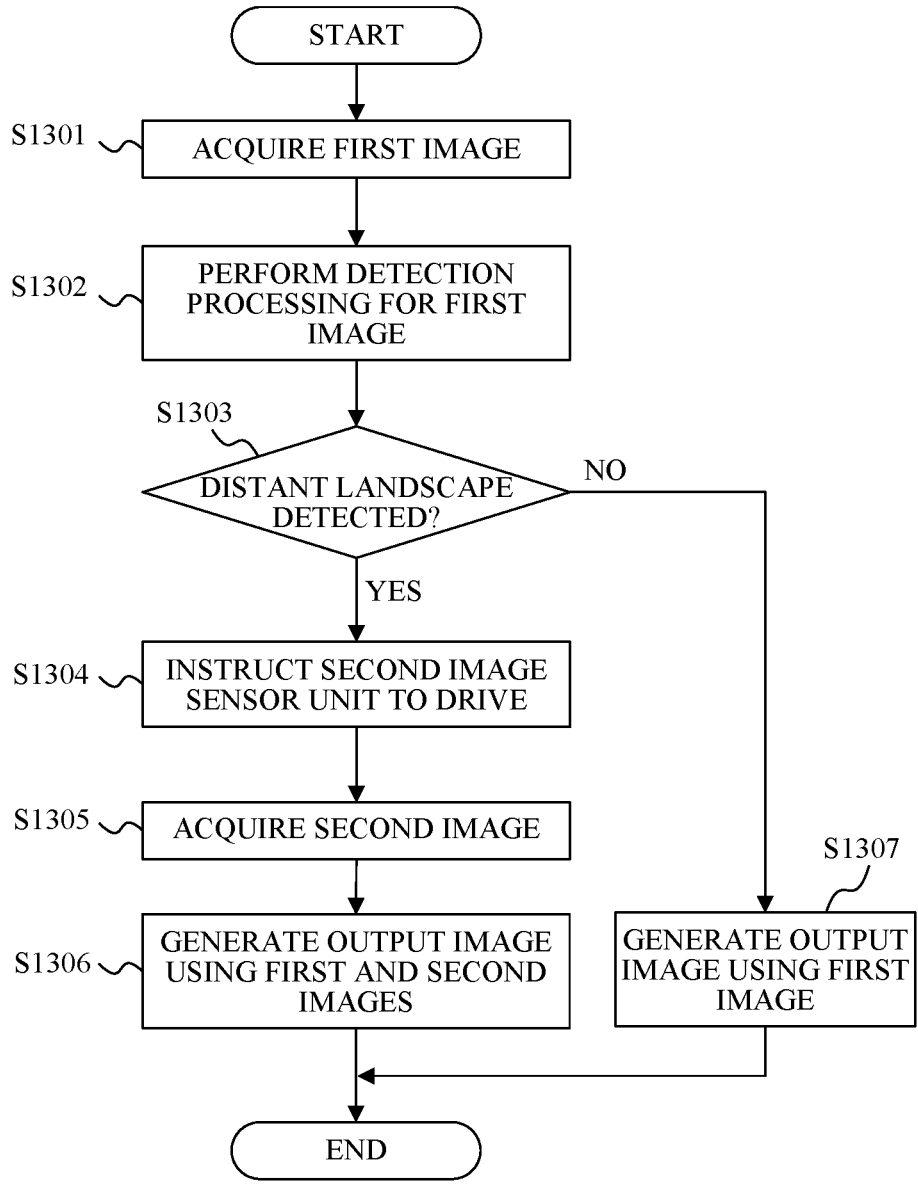
FIG. 13 illustrates a processing flow according to Example 4.

Processing according to this example will be described below in detail with reference to a flowchart in FIG. 13.

At step S1301, similarly to step S401 according to Example 1, the first image sensor unit 101 acquires a first image.

At step S1302, the detection processing unit 103 performs detection processing for the first image. The detection processing unit 103 determines whether a distant landscape exists in the first image, and outputs a result of the determination as detection information. When having determined that a distant landscape exists, the detection processing unit 103 outputs, as area information, information indicating an image area corresponding to the distant landscape. The detection information may include information indicating the position of the detection. For example, the distance to each object existing in the image is calculated, and the object is determined as a distant landscape in a case where the calculated distance is equal to or larger than a predetermined value.

At step S1303, the detection processing unit 103 determines whether a distant landscape is detected. In a case where it is determined that a distant landscape is detected at step S1303, the flow proceeds to step S1304. In a case where it is determined that no distant landscape is detected at step S1303, the flow proceeds to step S1307.

At step S1304, similarly to step S404 according to Example 1, the sensor drive control unit 104 instructs the second image sensor unit 102 to drive.

At step S1305, similarly to step S405 according to Example 1, the second image sensor unit 102 acquires a second image.

At step S1306, the output image generating unit 105 generates an output image using the first and second images and the flow ends.

At step S1307, similarly to step S407 according to Example 1, the output image generating unit 105 generates an output image using the first image and the flow ends. In this example, a first processed image generated at step S1401 to be described below is output as the output image.

Figure 14:
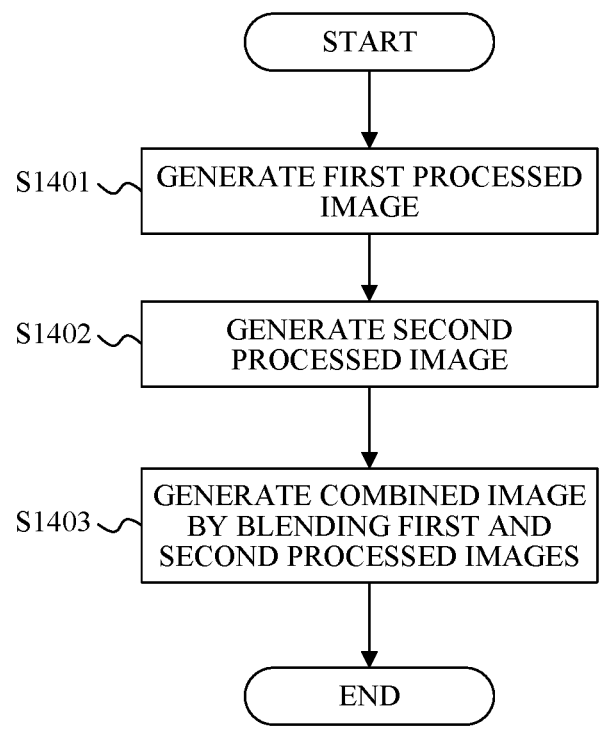
FIG. 14 illustrates an output image generation processing flow according to Example 4.

The processing at step S1306 will be described below in detail with reference to FIG. 14.

At step S1401, similarly to step S501 according to Example 1, the first image processing unit 301 generates a first processed image by performing image processing for the first image.

At step S1402, the second image processing unit 302 generates a second processed image by performing image processing for the second image. The performed image processing is, for example, noise reduction processing, gamma processing, or edge enhancement processing.

At step S1403, the combination unit 303 generates a combined image by blending the first and second processed images. In an example, in the area corresponding to the detected distant landscape, the combination unit 303 uses the second processed image as the luminance component of the combined image and uses the color component of the first processed image as the color component of the combined image. In another example, in the area corresponding to the detected distant landscape, the combination unit 303 uses, as the luminance component of the combined image, a result of the weighted average of the luminance component of the first and second processed images with certain weights and uses the color component of the first processed image as the color component of the combined image. The certain weights may be predetermined values or may be weights that differ in accordance with evaluation of the degree of haze of the distant landscape or the distance to the object.

A near-infrared image has such a characteristic that the image is unlikely to be affected by air and can reduce influence of fog and haze in weather. This characteristic of a near-infrared image is exploited in this example such that, only in a case where a distant landscape with fog or haze is detected in a visible image, the infrared image sensor is activated to acquire a near-infrared image, the luminance component of the acquired near-infrared image is extracted and blended with the visible image to improve visibility. In a case where no distant landscape with fog or haze is detected, the infrared image sensor is controlled not to drive.

Since power supply control suitable for properties of an object is performed as described above, the power, the calculation amount, the memory occupation amount, and the bus band occupation amount can be saved.

Example 5

An image processing apparatus according to this example generates an image with which the temperature of a pot can be intuitively understood using an image including infrared light information and acquired from the infrared image sensor. The image processing apparatus according to this example includes an optical system and an image sensor that are used for a digital camera or the like, and a module configured to perform image processing.

The configuration of the image processing apparatus according to this example is identical to the configuration (FIG. 1) of the image processing apparatus according to Example 1. However, characteristics of the second image sensor unit 102, a target to be detected by the detection processing unit 103, and the processing contents of the output image generating unit 105 are different from those of Example 1.

The first image sensor unit 101 is a normal RGB image sensor and acquires a first image. The second image sensor unit 102 is an infrared image sensor having sensitivity to long wavelength infrared and acquires a second image.

The detection processing unit 103 generates detection information and area information about an object by performing object detection processing for the first image. In this example, a "pot" is detected as the object.

The sensor drive control unit 104 controls the second image sensor unit 102. The sensor drive control unit 104 switches on and off the second image sensor unit 102 by controlling power supply to the second image sensor unit 102 in accordance with a result of the detection processing by the detection processing unit 103.

The output image generating unit 105 generates an output image using the first and second images based on at least one of the detection information and the area information. The processing contents of the output image generating unit 105 are different from those according to Example 1.

The configuration of the output image generating unit 105 according to this example is identical to the configuration (FIG. 9) of the output image generating unit 105 according to Example 3. However, the processing contents of the analysis processing unit 902 and the combination unit 903 are different from those of Example 3.

The first image processing unit 901 generates a first processed image by performing image processing for the first image. The analysis processing unit 902 generates analysis information by performing analysis processing for the second image. The combination unit 903 generates a combined image by superimposing the analysis information on the first processed image based on at least one of the detection information and the area information.

Figure 15:
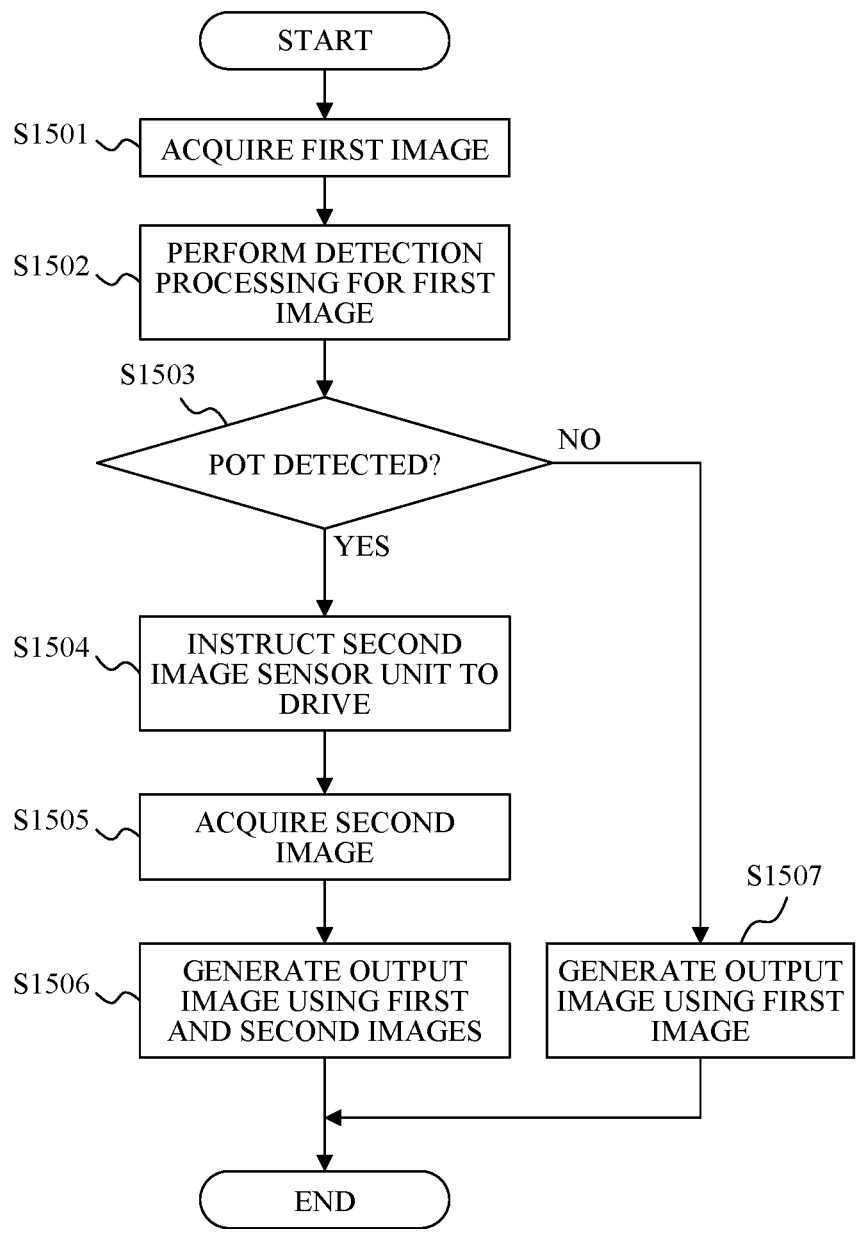
FIG. 15 illustrates a processing flow according to Example 5.

Processing according to this example will be described below in detail with reference to a flowchart in FIG. 15.

At step S1501, similarly to step S401 according to Example 1, the first image sensor unit 101 acquires a first image.

At step S1502, the detection processing unit 103 performs detection processing for the first image. The detection processing unit 103 determines whether a pot exists in the first image, and outputs a result of the determination as detection information. When having determined that a pot exists, the detection processing unit 103 outputs, as area information, information indicating an image area corresponding to the pot.

At step S1503, the detection processing unit 103 determines whether a pot is detected.

In a case where it is determined that a pot is detected at step S1503, the flow proceeds to step S1504. In a case where it is determined that no pot is detected at step S1503, the flow proceeds to step S1507.

At step S1504, similarly to step S404 according to Example 1, the sensor drive control unit 104 instructs the second image sensor unit 102 to drive.

At step S1505, similarly to step S405 according to Example 1, the second image sensor unit 102 acquires a second image.

At step S1506, the output image generating unit 105 generates an output image using the first and second images and the flow ends.

At step S1507, similarly to step S407 according to Example 1, the output image generating unit 105 generates an output image using the first image and the flow ends. In this example, a first processed image generated at step S1601 to be described below is output as the output image.

Figure 16:
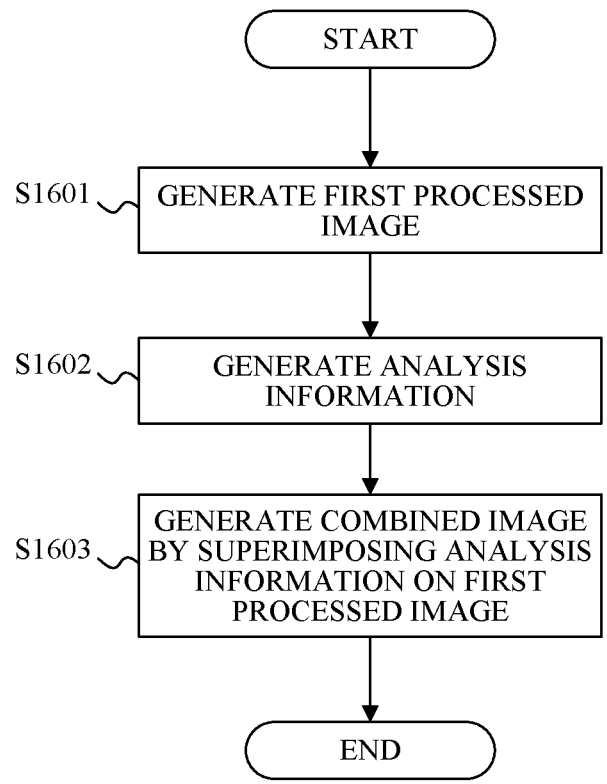
FIG. 16 illustrates a generation processing flow of an output image according to Example 5.

The processing at step S1506 will be described below in detail with reference to FIG. 16.

At step S1601, similarly to step S501 according to Example 1, the first image processing unit 901 generates a first processed image by performing image processing for the first image.

At step S1602, the analysis processing unit 902 generates analysis information by performing analysis processing for the second image. The generated analysis information is, for example, {product name, temperature}.

At step S1603, the combination unit 903 generates a combined image by superimposing the analysis information on the first processed image.

Figure 17A:
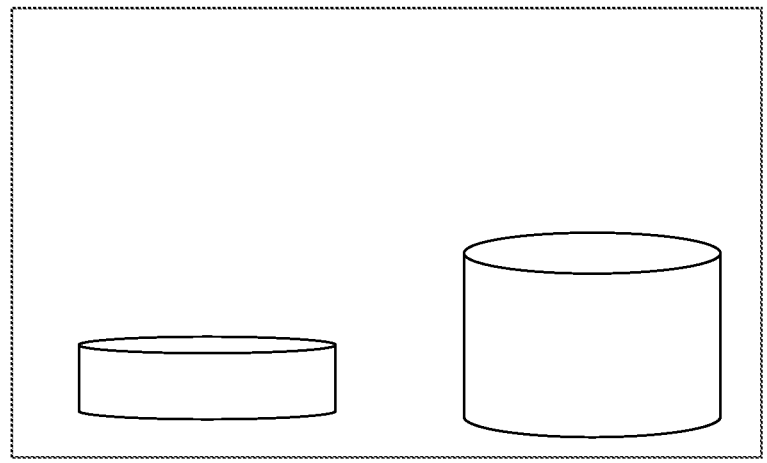
FIGS. 17A and 17B are schematic diagrams of output images in Example 5.
Figure 17B:
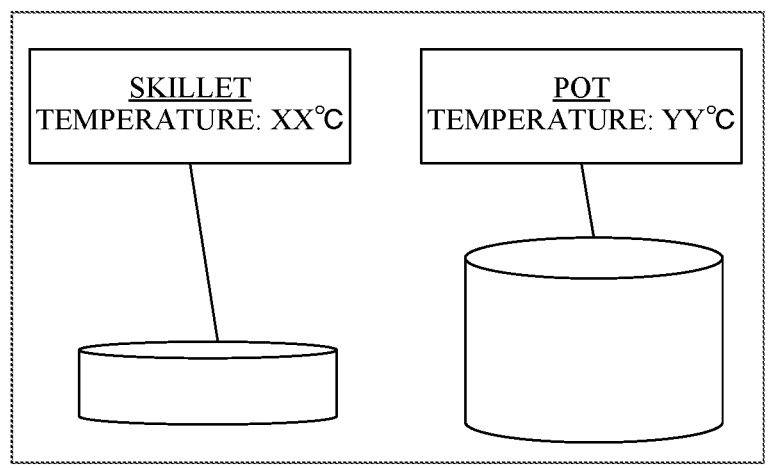

FIG. 17A is an example of the first processed image generated by the first image processing unit 901 and illustrates a case where a pot is detected. FIG. 17B is an example of the combined image generated by superimposing the analysis information on the first processed image. In this example, character information about {product name, temperature} is displayed as illustrative analysis information.

The combination unit 903 may surround an area corresponding to the detected pot by a frame colored in accordance with temperature as an example of the analysis information. Alternatively, the area may be denoted by an arrow colored in accordance with temperature. Instead of changing the color of the frame or arrow in accordance with temperature, the shape of the frame or arrow, such as thickness and size may be changed in accordance with the color. The combination unit 903 may change color information about the first processed image in accordance with temperature as an example of the analysis information.

The combination unit 903 may generate a combined image blending the first and second processed images generated by performing image processing for the first and second images as described according to Example 1. In an example, the combination unit 903 uses the second processed image in the area corresponding to the detected pot and uses the first processed image in the other area. In another example, the combination unit 903 uses a result of the weighted average of the first and second processed images with certain weights in the area corresponding to the detected pot and uses the first processed image in the other area.

As an example of the image processing performed on the second image in this case, the temperature of the object may be estimated based on the second image and a color component corresponding to the estimated temperature may be applied. The temperature can be intuitively understood by a user when a color component of blue is applied in an area corresponding to a low temperature and a color component of red is applied in an area corresponding to a high temperature.

The combination unit 903 may blend the first and second processed images and further superimpose the analysis information.

The temperature of an object can be estimated based on a long wavelength infrared image by exploiting a characteristic that a material releases infrared in accordance with temperature. This characteristic is exploited in this example such that, only in a case where a pot is detected in a visible image, the infrared image sensor is activated to acquire a long wavelength infrared image, temperature is estimated based on the acquired long wavelength infrared image, and information notifying an area corresponding to the detected pot is superimposed. In a case where no pot is detected, the infrared image sensor is controlled not to drive.

Since power supply control suitable for properties of an object is performed as described above, the power, the calculation amount, the memory occupation amount, and the bus band occupation amount can be saved.

Other Configurations

The above description of each example is made on a configuration with which the second image sensor unit is driven in a case where a particular object is detected and the second image sensor unit is not driven otherwise (in a case where a particular object is not detected).

The sensor drive control unit may drive the second image sensor unit with high electric power in a case where a particular object is detected, and may drive the second image sensor unit with low electric power otherwise. In an example, the sensor drive control unit may drive the second image sensor unit at high frame rate in a case where a particular object is detected, and may drive the second image sensor unit at low frame rate otherwise. In another example, the sensor drive control unit may acquire the second image at high resolution in a case where a particular object is detected, and may acquire the second image at low resolution otherwise.

The image processing apparatus may include first, second, and third image sensor units having characteristics different from one another. In this case, the image processing apparatus performs object detection processing for a first image acquired by the first image sensor unit. Then, the second image sensor unit may be driven in a case where a first object is detected, and the third image sensor unit may be driven in a case where a second object different from the first object is detected.

The image processing apparatus may execute processing of detecting a particular object at a constant time interval and may use the same detection result until the detection processing is executed again.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can save the power, the calculation amount, the memory occupation amount, and the bus band occupation amount even with a plurality of sensors mounted.

This application claims priority of Japanese Patent Application No. 2023-013790, which was filed on Feb. 1, 2023, and which is hereby incorporated by reference herein in its entirety.

What is claimed is:

1. An image processing apparatus comprising:
 a first image sensor unit configured to acquire a first image;
 a second image sensor unit having a characteristic different from that of the first image sensor unit and configured to acquire a second image; and
 a processor configured to:
 generate detection information about an object based on the first image;
 control driving of the second image sensor unit based on the detection information;
 generate an output image using at least one of the first image and the second image;
 generate a first processed image by processing the first image, analysis information by analyzing the second image, and a combined image by combining the first processed image and the analysis information;
 generate area information indicating an image area corresponding to a particular object based on the first image; and
 superimpose information notifying the image area corresponding to the area information on the first processed image based on the analysis information,
 wherein the information notifying is a frame or an arrow, and
 wherein the processor is configured to change a color or shape of the frame or the arrow in accordance with the analysis information.

2. The image processing apparatus according to claim 1, wherein the first image sensor unit acquires a visible light image.

3. The image processing apparatus according to claim 1, wherein the second image sensor unit acquires an image including infrared light information.

4. The image processing apparatus according to claim 1, wherein the second image sensor unit acquires an image including polarization information.

5. The image processing apparatus according to claim 1, wherein the processor drives the second image sensor unit in a case where a particular object is detected, and the processor does not drive the second image sensor unit in a case where the particular object is not detected by the processor.

6. The image processing apparatus according to claim 1, wherein the processor is configured to generate area information indicating an image area corresponding to a particular object based on the first image.

7. The image processing apparatus according to claim 6, wherein the processor is configured to cause the second image sensor unit to acquire the second image only for the image area corresponding to the area information.

8. The image processing apparatus according to claim 1, wherein the processor is configured to generate:
   a first processed image by processing the first image,
   a second processed image by processing the second image, and
   a combined image by combining the first processed image and the second processed image.

9. The image processing apparatus according to claim 8, wherein the processor is configured to generate the combined image by blending the first processed image and the second processed image with certain weights.

10. The image processing apparatus according to claim 8, wherein the processor is configured to generate the combined image by replacing at least part of the first processed image with the second processed image.

11. The image processing apparatus according to claim 8, wherein the processor is configured to generate:
    area information indicating an image area corresponding to a particular object based on the first image, and
    the combined image by combining the first processed image and the second processed image only for the image area corresponding to the area information.

12. The image processing apparatus according to claim 1, wherein the processor superimposes character information as the analysis information on the first processed image.

13. The image processing apparatus according to claim 1, wherein the processor is configured to change color information about the first processed image in accordance with the analysis information.

14. The image processing apparatus according to claim 8, wherein the processor is configured to generate:
    area information indicating an image area corresponding to a particular object based on the first image, and
    the combined image based on at least one of the detection information and the area information.

15. The image processing apparatus according to claim 1, wherein the processor is configured to:
    power on the second image sensor unit in a case where a particular object is detected by the processor, and
    power off the second image sensor unit in a case where the particular object is not detected by the processor.

16. The image processing apparatus according to claim 1, wherein the processor is configured to drive:
    the second image sensor unit at a high frame rate in a case where a particular object is detected by the processor, and
    the second image sensor unit at a low frame rate in a case where the particular object is not detected by the processor.

17. The image processing apparatus according to claim 1, wherein the processor is configured to cause the second image sensor unit to acquire:
    the second image at high resolution in a case where a particular object is detected by the processor, and
    the second image at low resolution in a case where the particular object is not detected by the processor.

18. The image processing apparatus according to claim 1, further comprising a third image sensor unit having a characteristic different from that of each of the first image sensor unit and the second image sensor unit and configured to acquire a third image,
    wherein the processor is configured to control driving of the second image sensor unit and the third image sensor unit based on the detection information.

19. The image processing apparatus according to claim 18, wherein the processor is configured to drive:
    the second image sensor unit in a case where a first object is detected, and
    the third image sensor unit in a case where a second object different from the first object is detected.

20. A method of controlling an image processing apparatus including a first image sensor unit configured to acquire a first image and a second image sensor unit having a characteristic different from that of the first image sensor unit and configured to acquire a second image, the method comprising the steps of:
    generating detection information about an object based on the first image; and
    controlling driving of the second image sensor unit based on the detection information;
    generating an output image using at least one of the first image and the second image;
    generating a first processed image by processing the first image, analysis information by analyzing the second image, and a combined image by combining the first processed image and the analysis information;
    generating area information indicating an image area corresponding to a particular object based on the first image, and
    superimposing information notifying the image area corresponding to the area information on the first processed image based on the analysis information:
    wherein the information notifying is a frame or an arrow, and
    wherein a color or shape of the frame or the arrow is changed in accordance with the analysis information.

21. A non-transitory computer-readable storage medium storing a computer program configured to cause a computer to execute the method according to claim 20.

* * * * *